United States Patent [19]

Ahsing et al.

[11] Patent Number: 5,234,066

[45] Date of Patent: Aug. 10, 1993

[54] POWER-ASSISTED WHEELCHAIR

[75] Inventors: Terry P. Ahsing, Encinitas, Calif.; Joe M. Hopping; Alan R. Owen, both of Longmont, Colo.; Jerome C. Stenehjem, Del Mar, Calif.

[73] Assignee: Staodyn, Inc., Longmont, Colo.

[21] Appl. No.: 612,824

[22] Filed: Nov. 13, 1990

[51] Int. Cl.⁵ .............................. B62D 11/04
[52] U.S. Cl. ...................... 180/6.5; 180/11; 180/65.2; 180/65.8; 180/907; 340/870.37; 341/21
[58] Field of Search ......... 280/250.1, 304.1, DIG. 10, 280/272, 89; 180/6.5, 907, 65.2, 65.1, 65.6, 65.8; 340/870.37; 341/20, 21; 73/780; 324/686

[56] References Cited

U.S. PATENT DOCUMENTS

| 862,267 | 8/1907 | Meyer | 280/89 |
|---|---|---|---|
| 3,012,192 | 12/1961 | Lion | 324/610 |
| 3,064,744 | 11/1962 | Jennings | 180/6.5 |
| 3,668,672 | 6/1972 | Parnell | 340/200 |
| 3,729,991 | 9/1973 | Hardway, Jr. | 323/93 |
| 3,770,073 | 11/1973 | Meyer | 180/65.6 |
| 3,784,897 | 1/1974 | Norrie | 323/93 |
| 3,961,318 | 6/1976 | Farrand et al. | 340/200 |
| 4,037,676 | 7/1977 | Ruse | 180/6.5 |
| 4,050,533 | 9/1977 | Seamone | 180/907 |
| 4,092,579 | 5/1978 | Weit | 318/662 |
| 4,125,169 | 11/1978 | Harris et al. | 180/6.5 |
| 4,238,781 | 12/1980 | Vercelloti et al. | 340/870.37 |
| 4,246,452 | 1/1981 | Chandler | 341/20 |
| 4,323,133 | 4/1982 | Williams | 280/250.1 |
| 4,323,829 | 4/1982 | Whitney et al. | 341/20 |
| 4,422,515 | 12/1983 | Loveless | 180/6.5 |
| 4,634,941 | 1/1987 | Klimo | 180/6.5 |
| 4,755,731 | 7/1988 | Anthony et al. | 318/662 |
| 5,012,237 | 4/1991 | Rosswurm | 340/870.37 |

FOREIGN PATENT DOCUMENTS 1-197809 8/1989 Japan.

OTHER PUBLICATIONS

Lion, "Capacitive Transducers", Instruments & Control Systems, Jun. 1966, pp. 157–159.

Primary Examiner—Margaret A. Focarino
Assistant Examiner—Anne Marie Boehler
Attorney, Agent, or Firm—Robert E. Harris

[57] ABSTRACT

A power-assisted wheelchair is disclosed that is particularly well suited for use by a person capable of exerting some hand/arm force in attempting to propel the wheelchair while seated therein, but incapable of exerting sufficient force, at least in some instances, to achieve satisfactory overall non-assisted operation of the wheelchair. Power-assist is provided by an electrical power unit that includes a motor for driving each main wheel of the wheelchair, with the power unit being removable to facilitate folding of the wheel chair when not in use. Motor energization is initiated when the user exerts force on the hand rims, connected with the drive wheels, in an attempt to propel the wheelchair. Displacement of the handrim relative to the associated drive wheel caused by the user exerted force is sensed and an electrical signal is produced to cause motor energization, with structure and feedback circuitry also being included for enhancing the efficiency of the power assist thus provided.

32 Claims, 13 Drawing Sheets

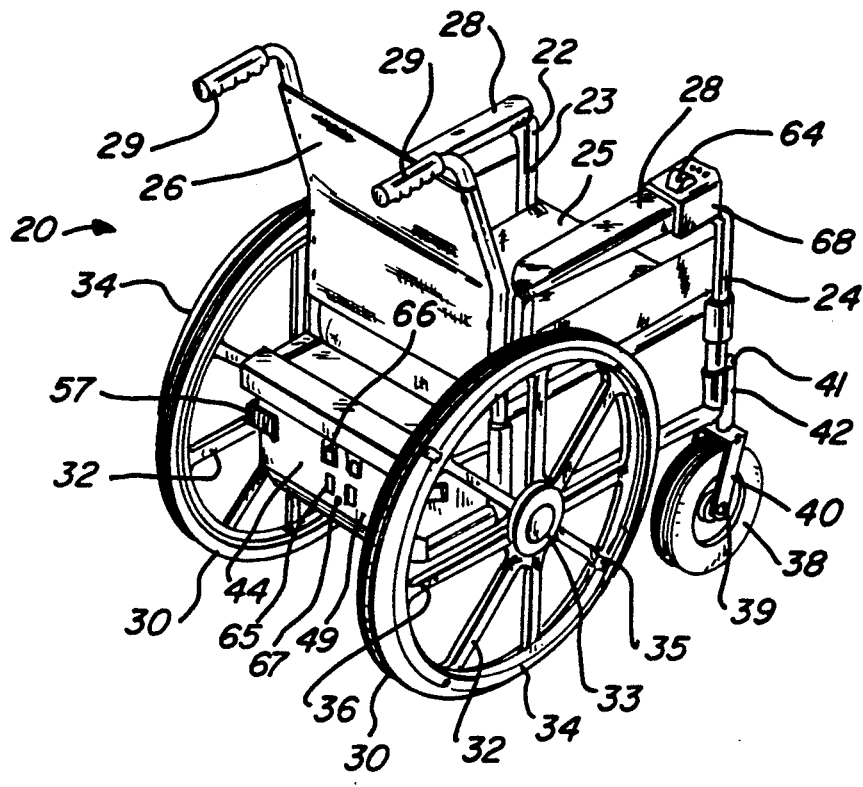
Fig_1
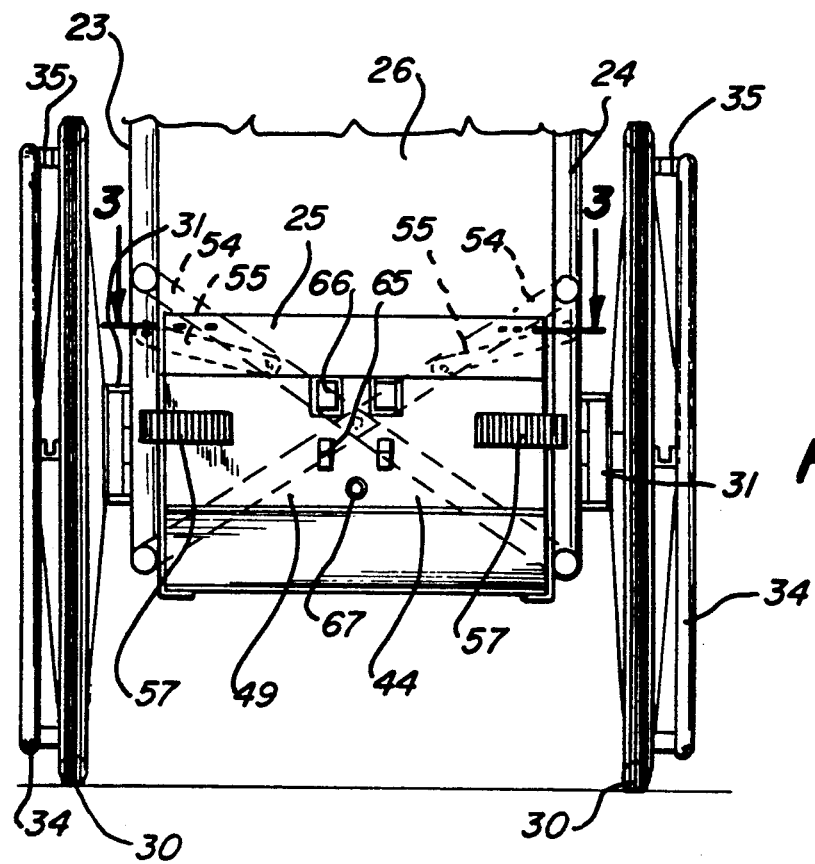
Fig_2

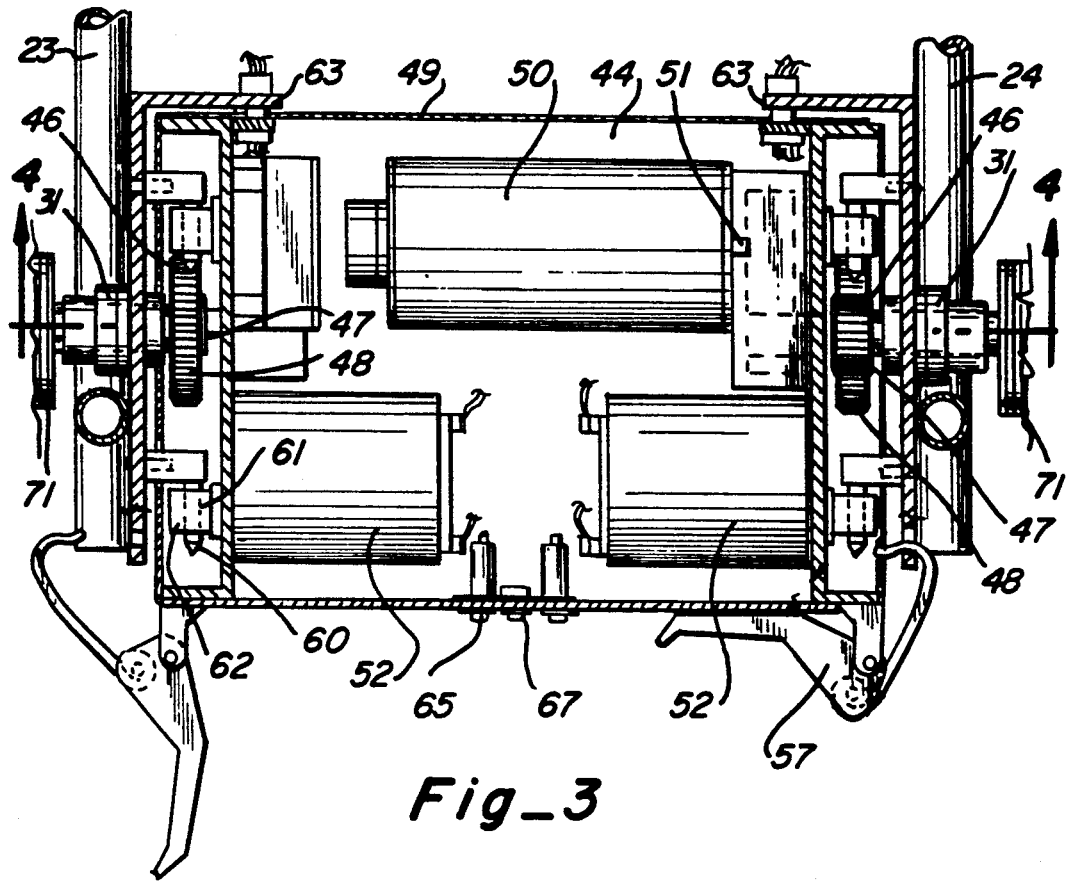
Fig_3
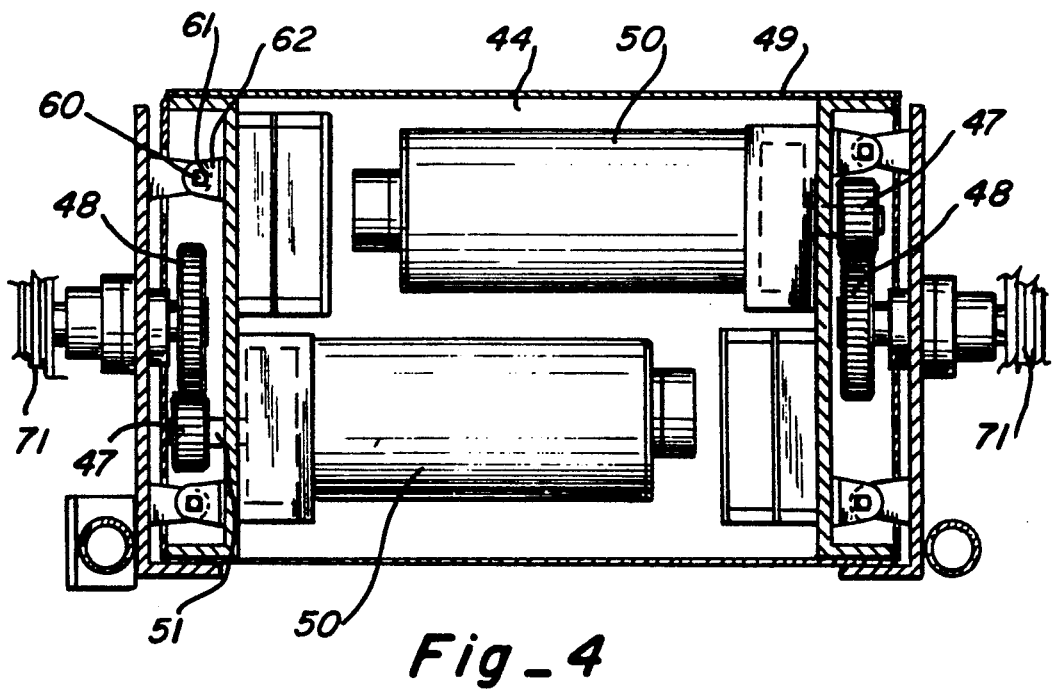
Fig_4

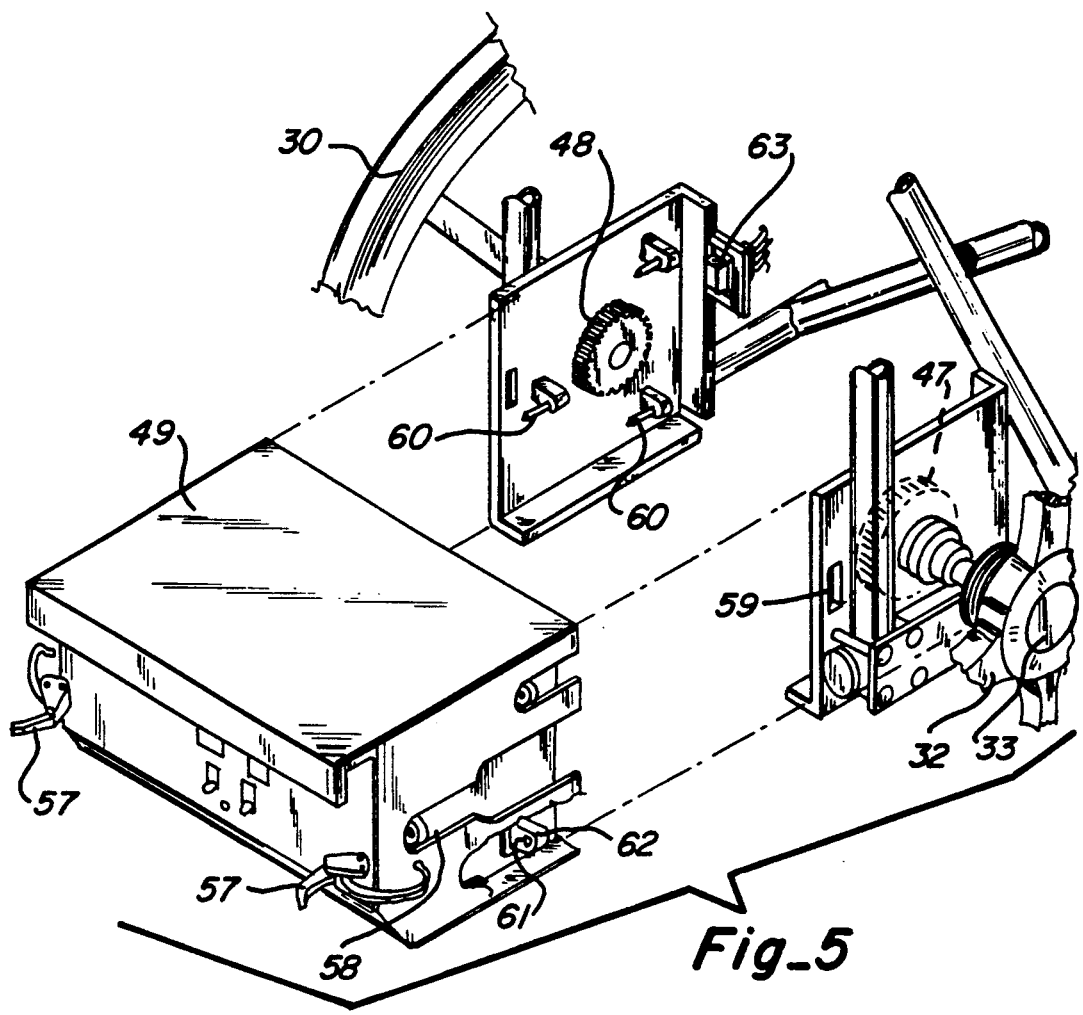
Fig_5
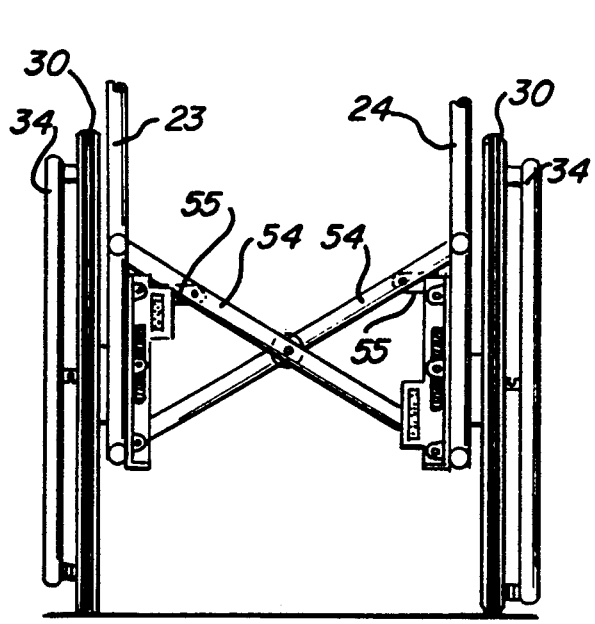
Fig_6
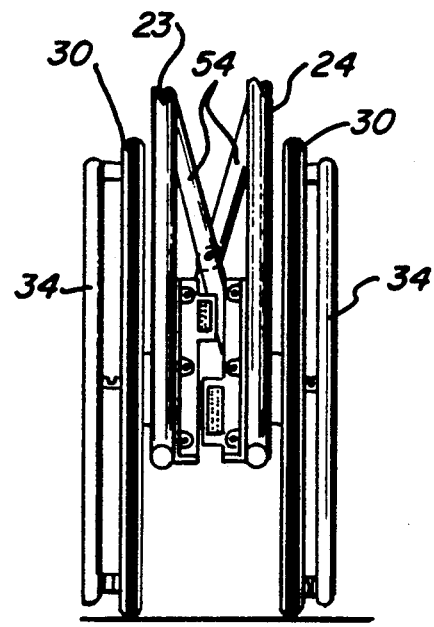
Fig_7

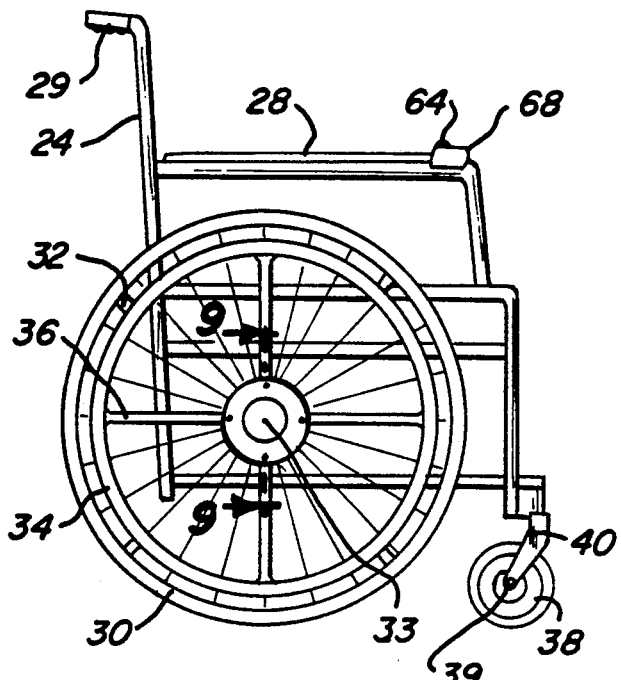
Fig_8
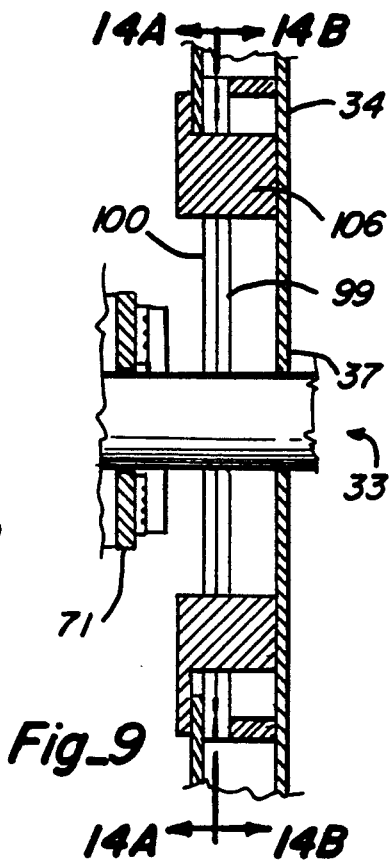
Fig_9
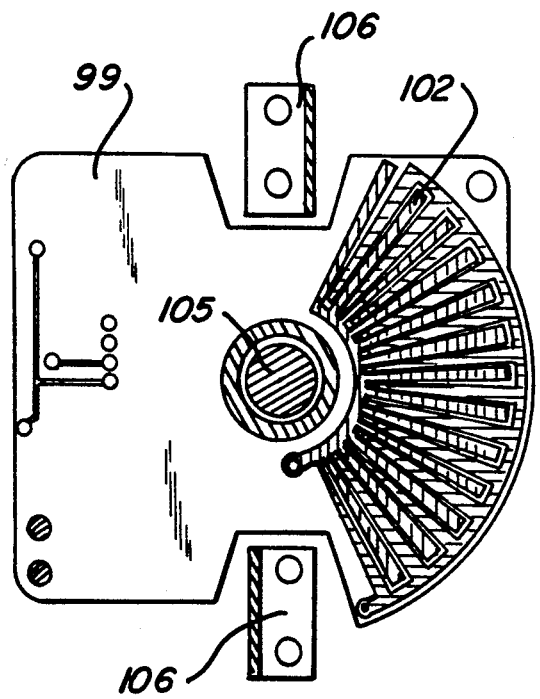
Fig_14A
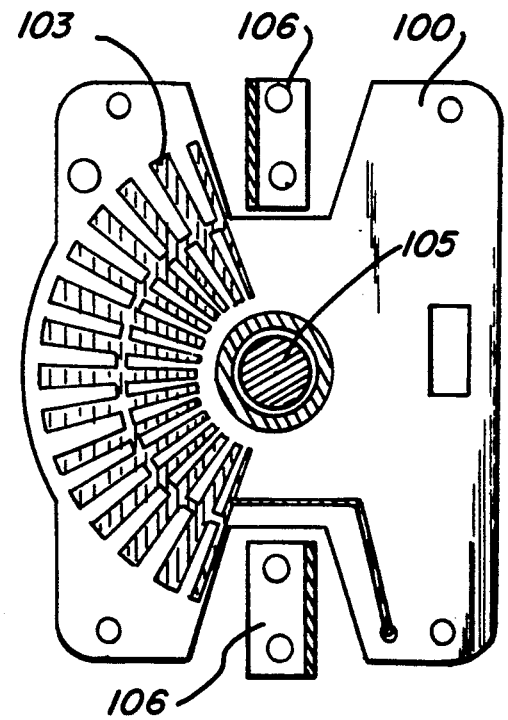
Fig_14B

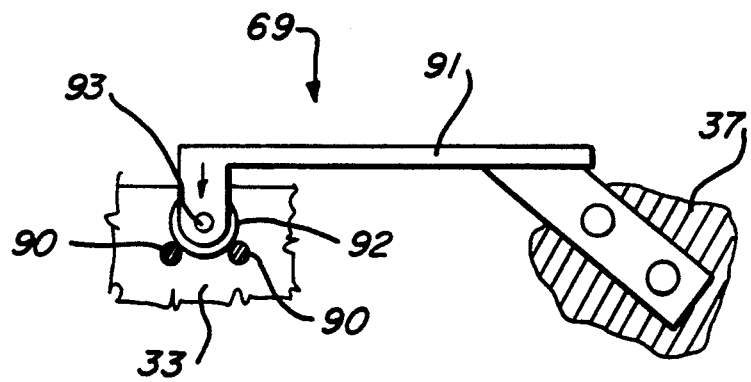
Fig_11
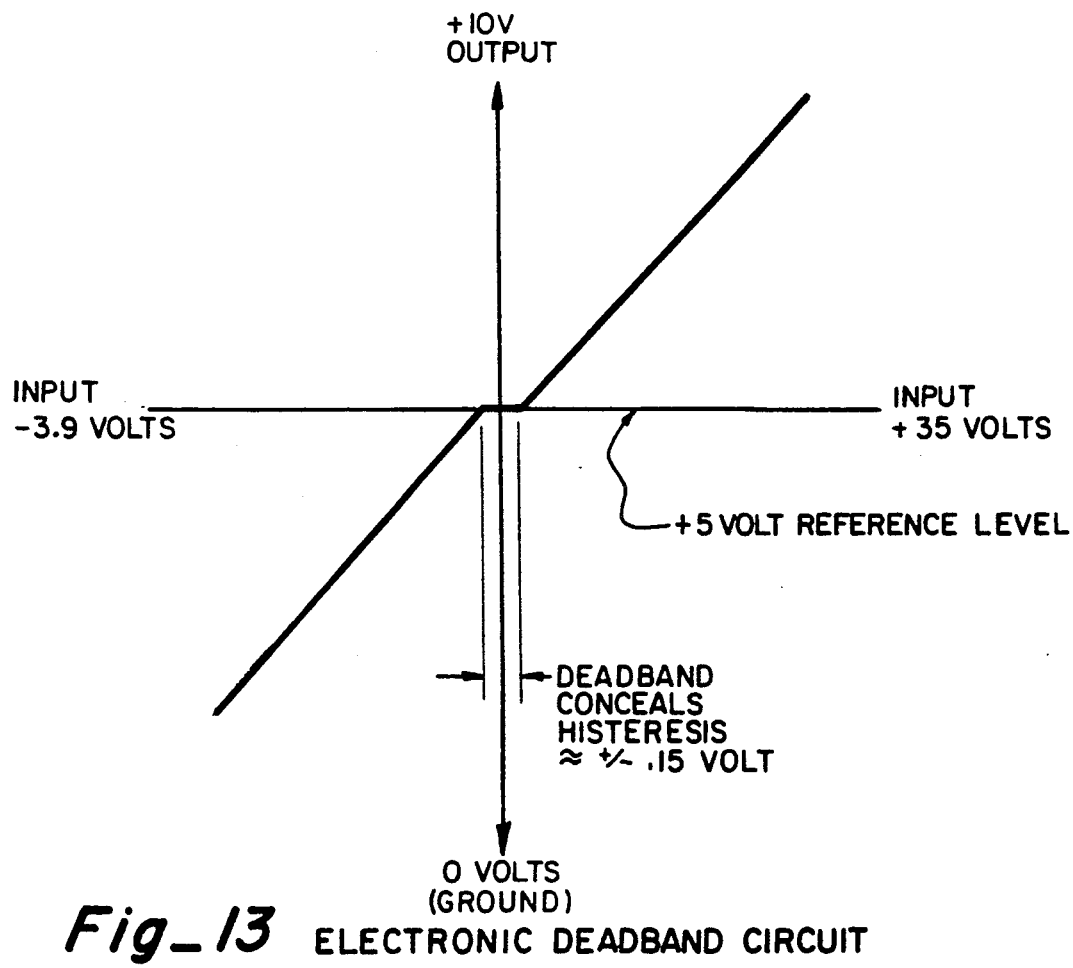
Fig_13 ELECTRONIC DEADBAND CIRCUIT

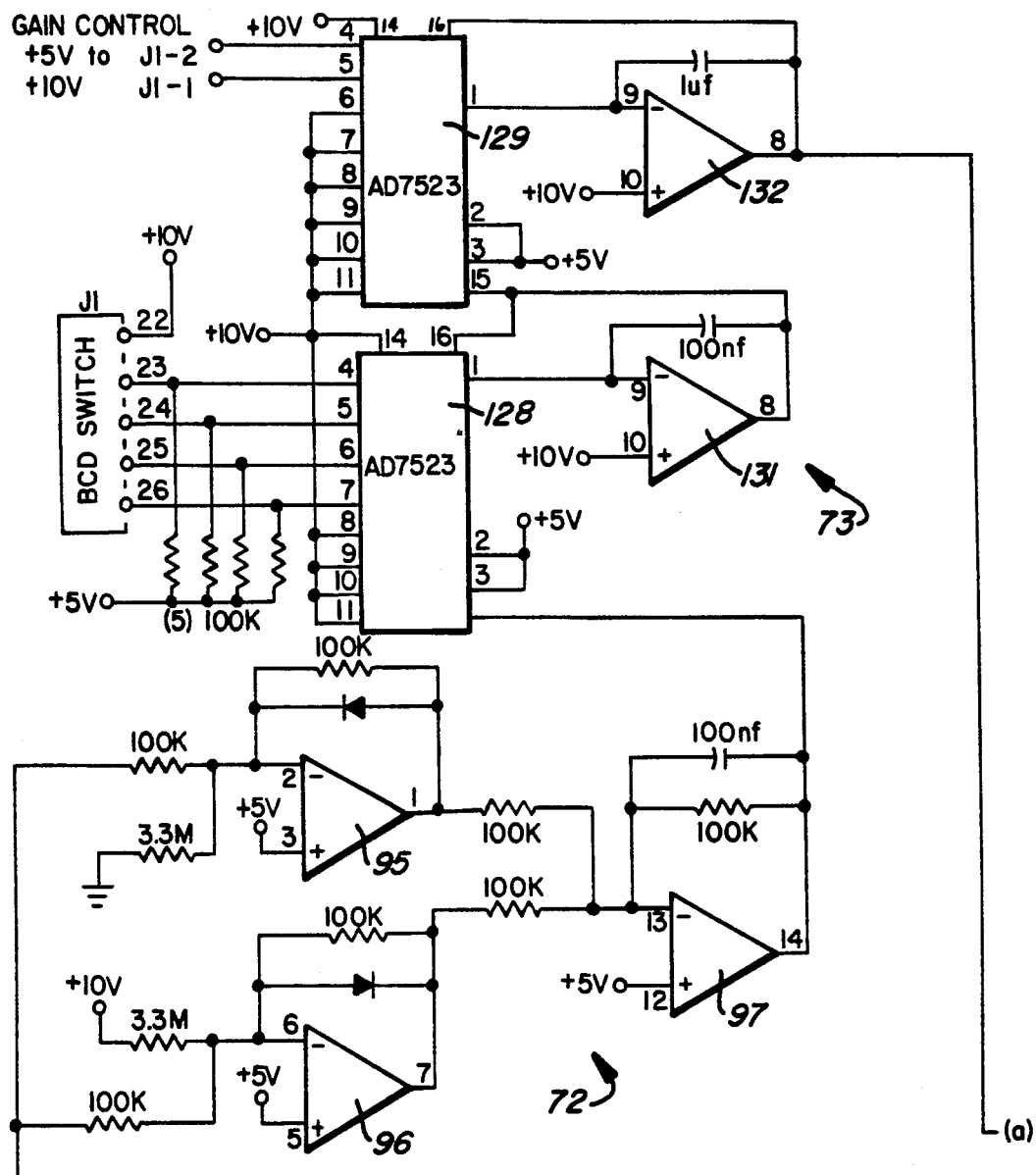
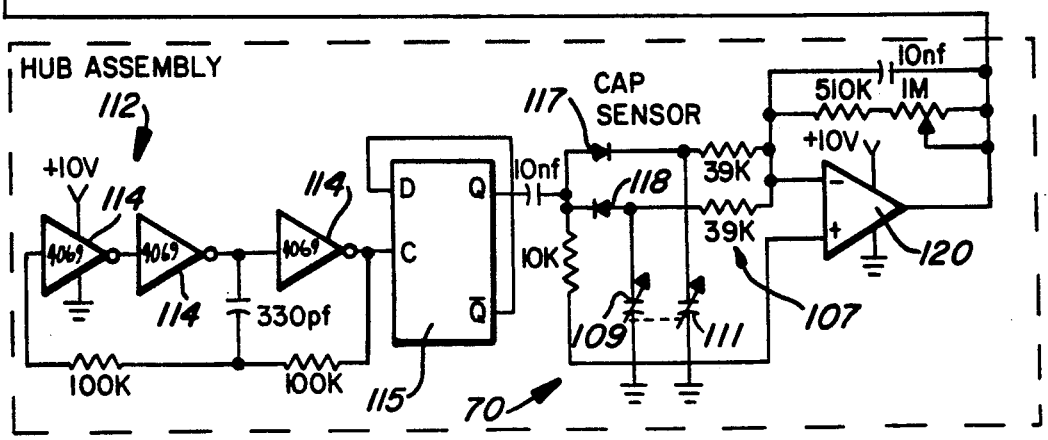
Fig_12A

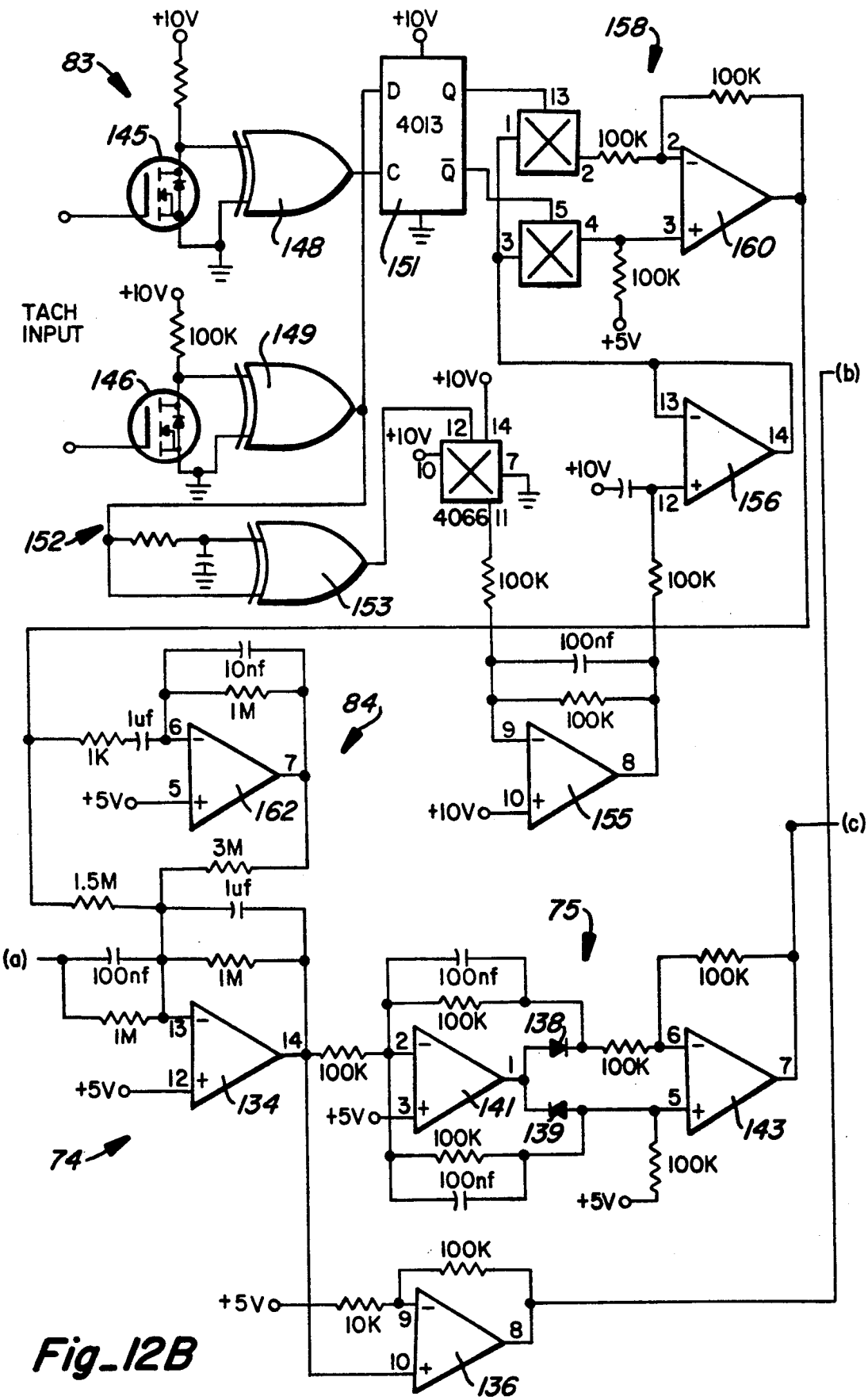
Fig_12B

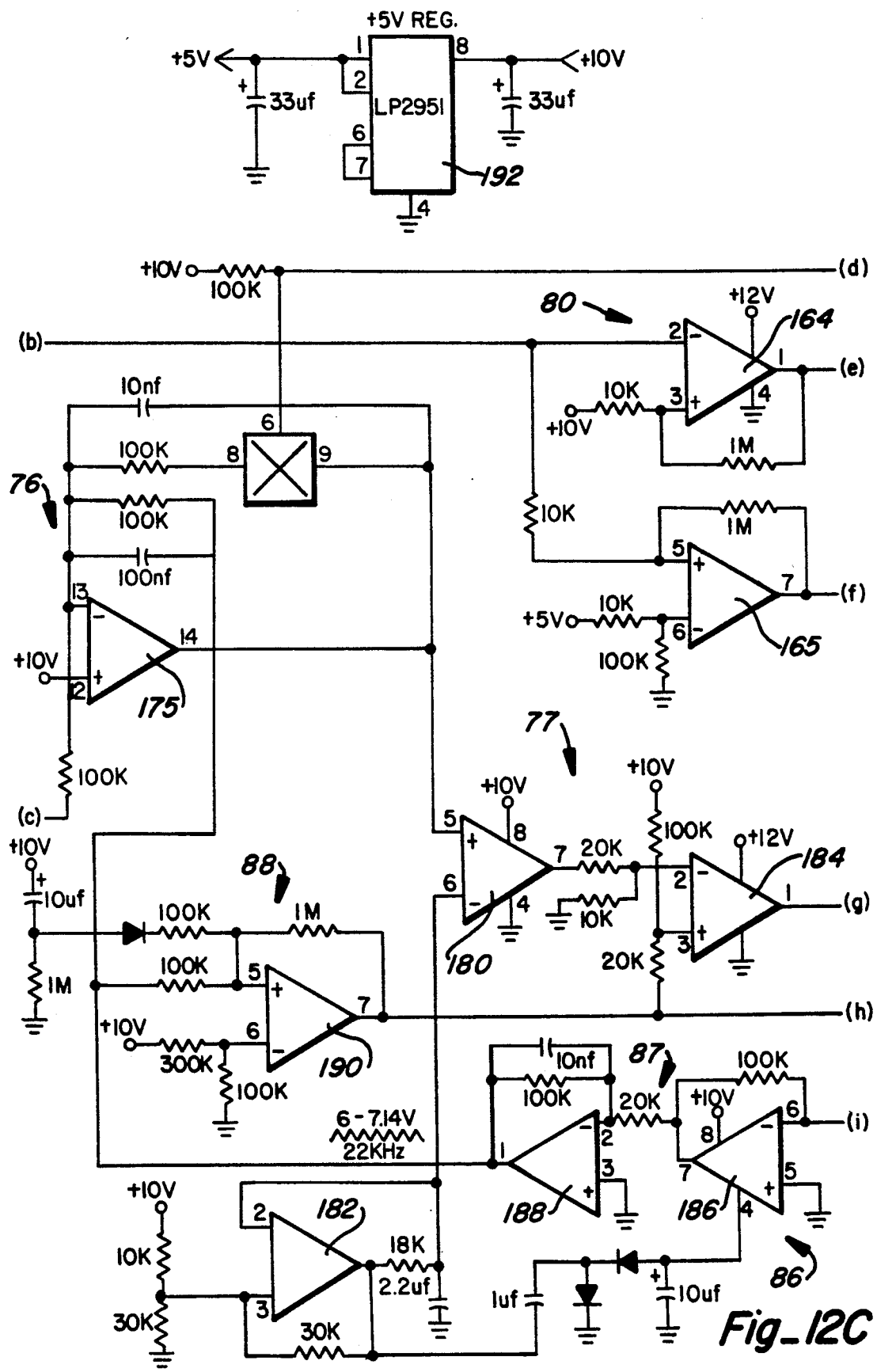
Fig_12C

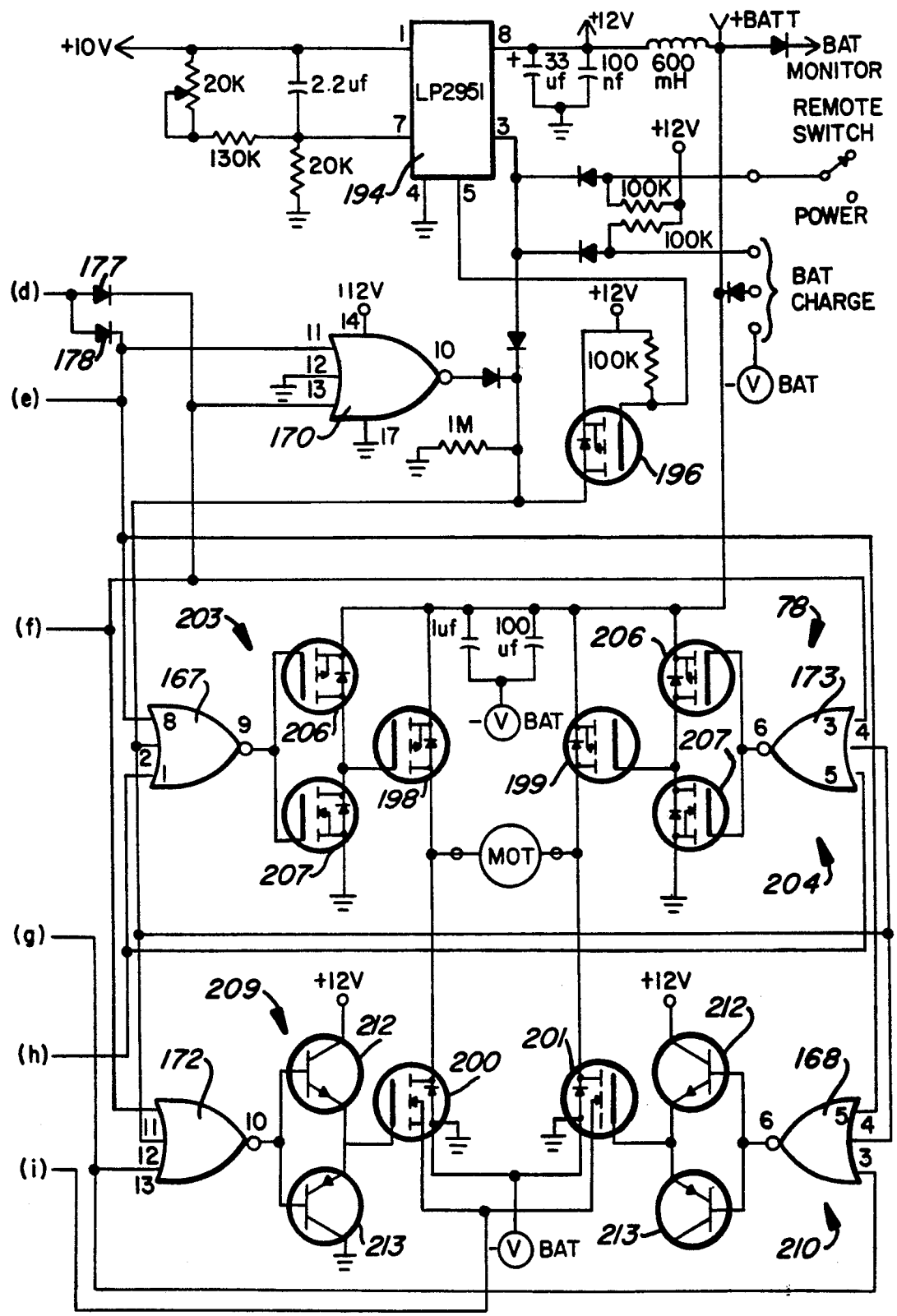
Fig_12D

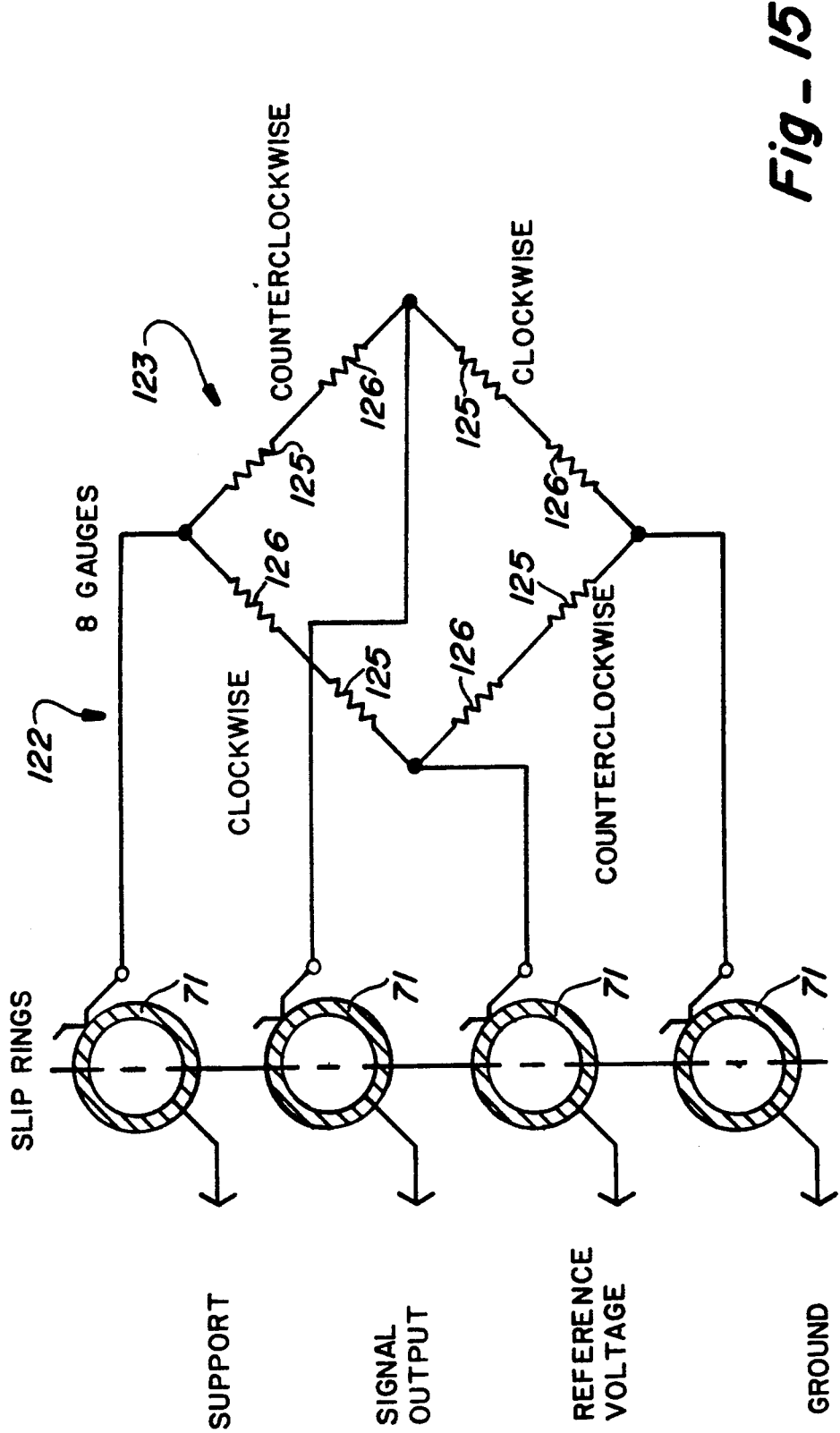

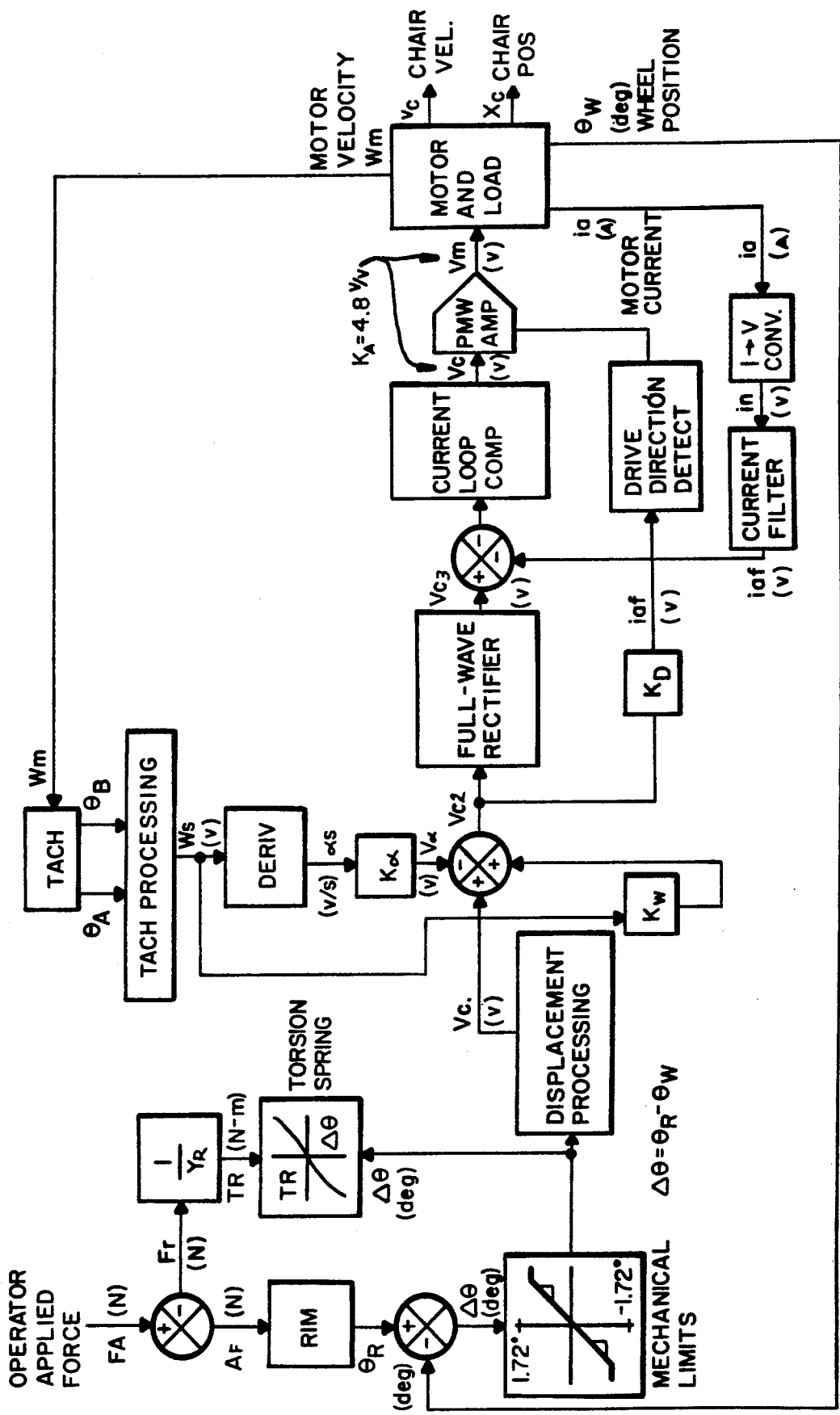
Fig_16

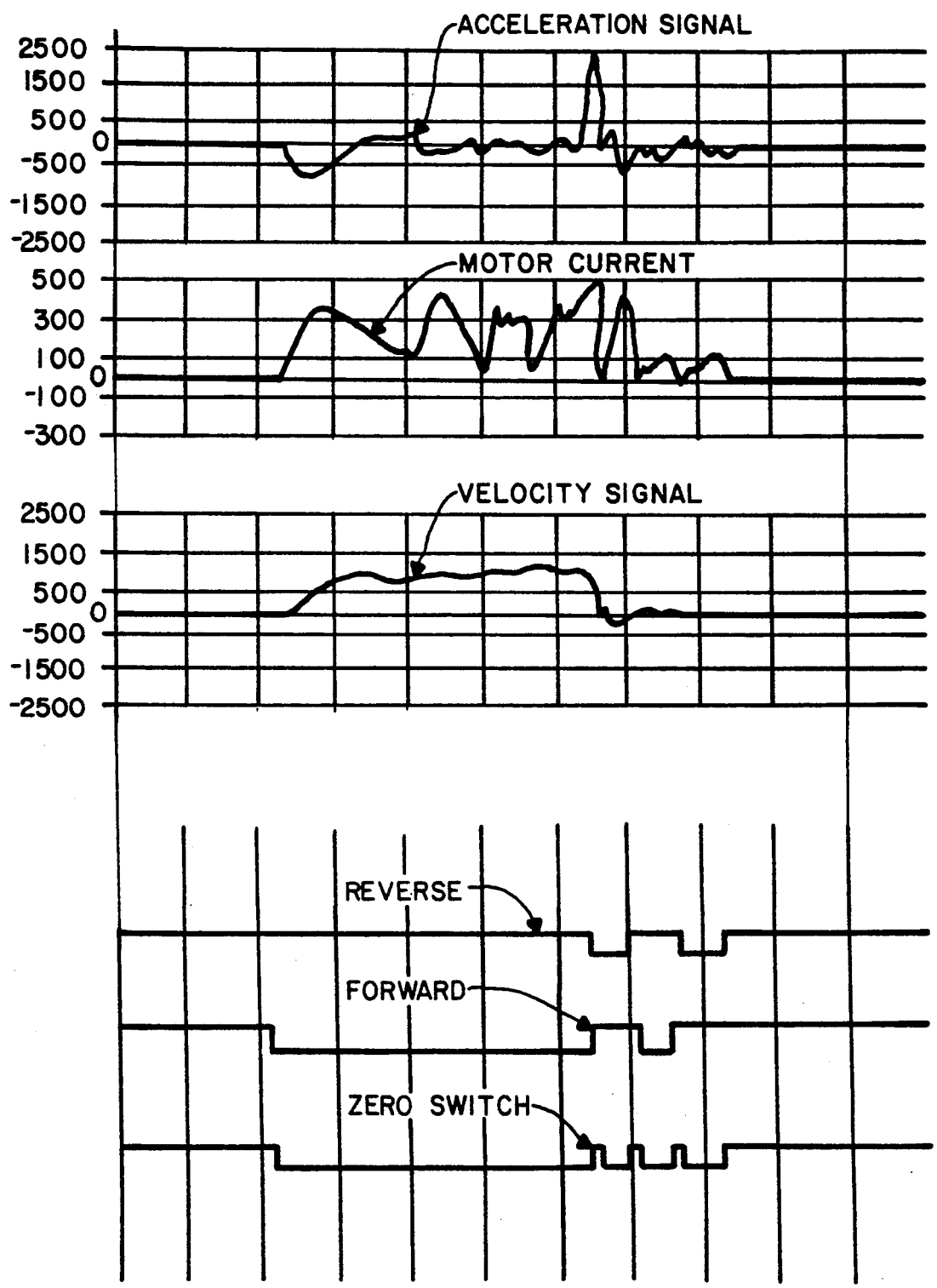
Fig_17
MOTOR CONTROL SIGNALS

POWER-ASSISTED WHEELCHAIR

FIELD OF THE INVENTION

This invention relates to a wheelchair, and, more particularly, relates to a power-assisted wheelchair.

BACKGROUND OF THE INVENTION

Wheelchairs are now in wide use, and various types have been heretofore suggested, including wheelchairs powered by electrical drive units.

Various types of control systems have been heretofore suggested for controlling application of drive to the wheels of a powered wheelchair, with a joy-stick being often utilized as the control actuator to be manipulated by the user.

While joy-stick type controls for powered wheelchairs have extended self-propelled use of wheelchairs to some severely handicapped persons, such powered wheelchairs have not proved to be entirely satisfactory for use by at least some groups of potential users, including, for example, persons having sufficient use of their hands and/or arms to enable that user to at least partially manually propel the wheelchair by application of force to the hand rims connected to the main wheels thus affording the user satisfaction and/or exercise. In addition, powered wheelchairs are most often quite heavy and/or cumbersome, and joy-stick type controlled power wheel chairs have been found by at least some users to be more difficult to maneuver in close quarters.

Wheelchairs have also heretofore been configured so as to be foldable, or collapsible, to facilitate transporting and/or storage, and some such wheel chairs have been provided with power units at least some components of which have been removable (see, for example U.S. Pat. Nos. 3,770,073 and 3,064,744).

A power-assisted wheelchair for use by a partially disabled person having sufficient use of hands and/or arms to enable some application of force to the hand rims of the wheelchair to cause energization of electric motors by sensing displacement of the hand rims relative to the drive wheel has been heretofore suggested (see U.S. Pat. Nos. 4,050,533, 4,125,169 and 4,422,515). Such wheelchairs, however, have not proved to be entirely satisfactory, and improvements in such wheelchairs are therefore still desired and/or needed.

SUMMARY OF THE INVENTION

This invention provides an improved wheelchair and, more particularly, an improved wheelchair having a power unit that provides a power-assist which is activated when the user exerts force on the hand rims of the wheelchair in a manner directed toward manual propulsion of the wheelchair by the user.

The power unit includes an electric motor drivingly engagable with each main wheel of the wheelchair, with motor energization being controlled by a control signal that is generated in response to the user seated in the wheelchair exerting force on the associated hand rim in an attempt to manually propel the wheelchair. Structure and feedback circuitry are also provided to enhance the efficiency of the power assist provided, and the power unit is removable to facilitate folding up of the wheelchair when not in use.

It is therefore an object of this invention to provide an improved wheelchair.

It is another object of this invention to provide an improved wheelchair having a power-assist unit.

It is still another object of this invention to provide an improved power assisted wheelchair having an electrical power unit capable of assisting manual propelling of the wheelchair by the user.

It is yet another object of this invention to provide an improved power-assisted wheelchair having an electric motor energized by a control signal that is generated when the user applies force to a hand rim of the wheelchair in an attempt to propel the wheelchair.

It is yet another object of this invention to provide an improved power-assisted wheelchair that includes structure and feedback circuitry for enhancing the efficiency of operation of the wheelchair.

It is yet another object of this invention to provide an improved power-assisted wheelchair that is configured to allow removal of the power unit and folding of the wheelchair when not in use.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view of the power-assisted wheelchair of this invention;

FIG. 2 is a partial rear view of the power-assisted wheelchair shown in FIG. 1;

FIG. 3 is a sectional view taken through lines 3—3 of FIG. 2;

FIG. 4 is a sectional view taken through lines 4—4 of FIG. 3;

FIG. 5 is an exploded perspective view illustrating the removable power unit positioned for normal use;

FIG. 6 is a rear view of the wheelchair illustrating the wheelchair with the power unit removed;

FIG. 7 is a rear view of the wheelchair similar to that of FIG. 6 but illustrating the wheelchair folded;

FIG. 8 is a side view of the wheelchair;

FIG. 9 is the sectional view taken through lines 9—9 of FIG. 8;

FIG. 11 is a partial mechanical side view sketch illustrating rim centering;

FIGS. 12A, 12B, 12C and 12D, taken together, provide a schematic of the electrical circuitry shown in block form in FIG. 10;

FIG. 13 is a graph illustrating operation of the deadband circuit shown in FIG. 12A;

FIGS. 14A and 14B illustrate opposing face views of a capacitive sensor used for force sensing;

FIG. 15 is a schematic diagram of a strain gauge sensor illustrating an alternate embodiment for force sensing;

FIG. 16 is a block diagram illustration motion control forces of the power-assisted wheelchair; and FIG. 17 illustrates typical signals generated utilizing the circuitry of FIG. 12.

DESCRIPTION OF THE INVENTION

Figure 10:
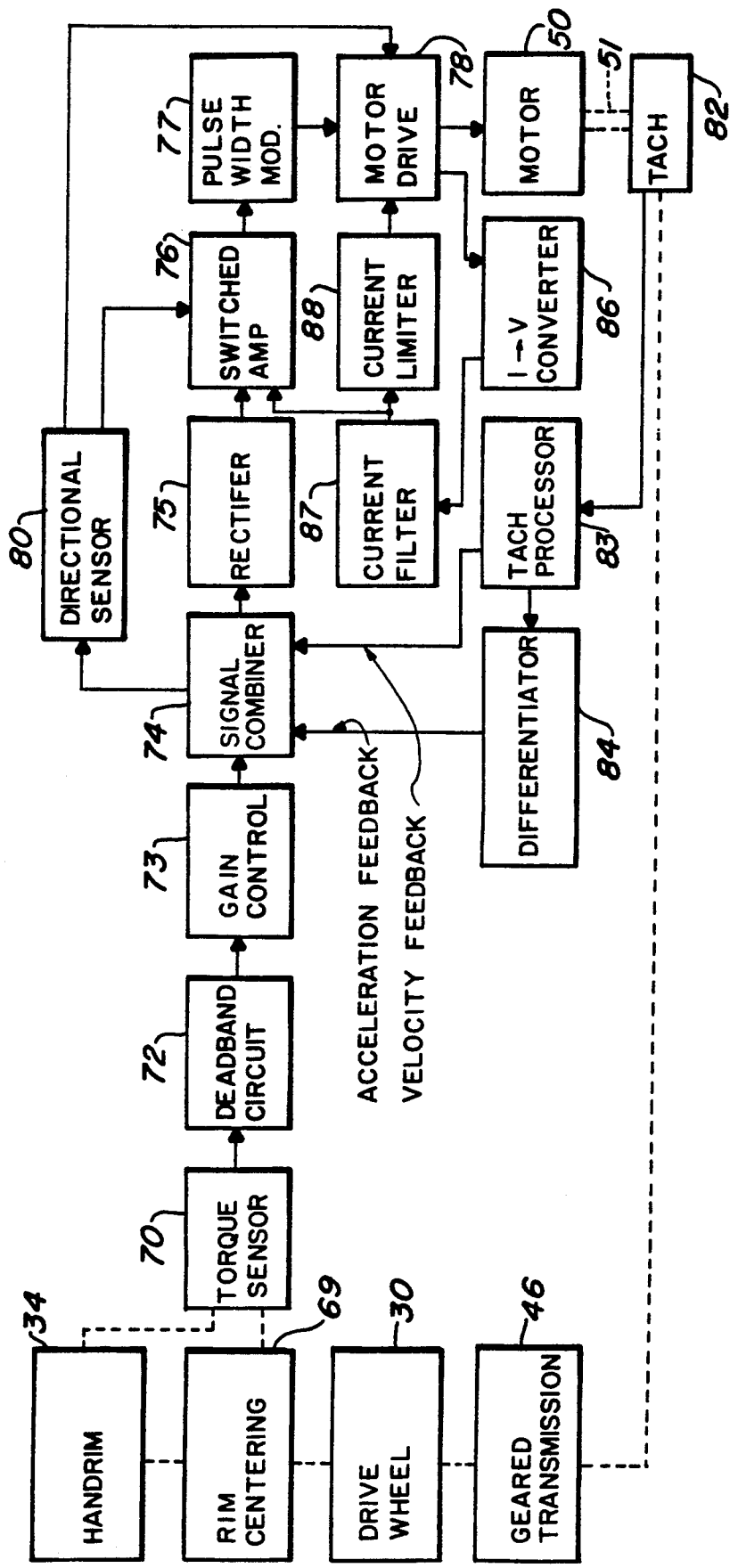
FIG. 10 is a block diagram illustrating the overall electrical and mechanical arrangement to provide power-assist.

As shown in FIGS. 1 through 9, wheelchair 20 conventionally includes frame 22 having spaced side portions 23 and 24, and a seat 25 and back support 26 extending between frame side portions 23 and 24. In addition, an arm rest 28 is provided at each of the frame portions 23 and 24 above seat 25 and forwardly of back support 26, and a handle 29 is provided at each of the frame portions 23 and 24 above and rearwardly of back support 26 to facilitate movement of the wheelchair by a person not then seated therein.

A drive wheel 30 is rotatably mounted outwardly of each side portion of frame 22 by wheel mount 31 with each drive wheel having spokes 32 extending to hub 33. Handrim 34 is connected with each drive wheel 30 by means of connecting flexible spacers 35 with each handrim also being connected by means of spokes 36 to central rim portion 37 at hub 33. With this arrangement, handrim 34 can be displaced slightly (no more than about two degrees) with respect to the associated drive wheel.

A front, or caster, wheel 38 is rotatably mounted on horizontal pin 39 in forked mount 40, with each mount having an upstanding vertical shaft 41 received in vertical socket 42 at the front edge of each side portion of frame 22 to thus enable the guide wheels to freely rotate about both a horizontal axis and a vertical axis, as is conventional.

Power assist is provided for wheelchair 20 by means of power unit 44 mounted on wheelchair 20 between drive wheels 30, with the power unit preferably being removable to allow the wheelchair to be folded when not in use. As brought out more fully hereinafter, power unit 44 is continuously drivingly connected to each drive wheel 27 through geared transmission 46, as best illustrated in FIGS. 3 and 4. Geared transmission 46 preferably a three-stage geared transmission having a 59:1 step-down ratio, and includes drive gear 47 which continuously meshes with gear 48 when power unit 44 is positioned for normal operation in wheelchair 20.

Power unit 44 is shown positioned for normal operation in FIGS. 1 through 4, and FIGS. 3, 4 and 5 illustrate drive gear 47 in continuous engagement with gear 48 (connected with an associated drive wheel 30) when the power unit is in normal operating position at wheelchair 20.

As best shown in FIGS. 3 and 4, power unit 44 includes a casing 49 having a pair of electric motors 50 therein each of which is offset with respect to the axis of rotation of drive wheels 30 (gear 48 rotates about the axis of rotation of both drive wheels 30) so that the drive gear 47, connected with motor drive shaft 51 of each motor 50, engages each gear 48 (with engagement of one gear 47 to its associated gear 48 being at the side opposite to that of engagement of the other gear 47 with its associate gear 48). Casing 49 of power unit 44 also has a pair of batteries 52 therein, each of which is connected with a different one of motors 50.

As indicated in FIGS. 1 and 2, when wheelchair 20 is in normal operating position, frame portions 23 and 24 are spaced from one another so that the seat 25 and back 26 fully extend therebetween. When the wheelchair has a foldable configuration (it is, of course, not necessarily foldable, although normally preferred) the seat and back are made of readily foldable material such as padded leather, canvas, or vinyl, for example). When unfolded, cross-braces 54 and links 55 are utilized to maintain the wheelchair in this position.

In addition, buckles, or similar fasteners, 57 on casing 49 and frame 22 are utilized to releasably maintain power unit 44 in normal operating position at wheelchair 20, and, as illustrated in FIG. 5, guides 58 in casing 49 engage projections 59 on the side portion of frame 22 when the power unit is inserted with the lower rear power unit receiving area of wheelchair 20, and mounting pins 60, attached to the side portions of frame 22, are received as apertures 61 in outstanding arms 62 of casing 49 to provide precise mounting of power unit 44 to insure mating of gears 47 and 48 when power unit 44 is in operating position in wheelchair 20.

As brought out above, it is preferred that wheelchair 20 be configured for folding. In addition, it is desirable that power unit 44 be removable from wheelchair 20 (regardless of whether configured for folding). To remove the power unit from the wheelchair, the buckles are unbuckled, and the power unit pulled rearwardly (which disengages gears 47 and 48). If the wheelchair has a foldable configuration, the wheelchair is ready to be folded, as indicated in FIG. 6, after removal of the power unit. When folded, as indicated in FIG. 7, the wheelchair is compact, and may be readily transported and/or stored.

As also best shown in FIGS. 3 and 5, electrical connections 63 are also provided at one side of casing 49 to facilitate connection of switches 64 with the electronic circuitry within casing 49. As shown in FIGS. 1 and 2, off-on switches 65, circuit breaker 66, and a battery recharging plug 67 are also provided at the rear of casing 49.

Power unit 44 is configured so that each drive wheel is powered independently of the other with the power assist provided by power unit 44 to each drive wheel 30 being activated by applying force to the handrim 34 associated with that drive wheel. The amount of assist provided may be adjustably controlled by a user by means of switches 64 which are preferably mounted on switch mount 68 on one arm 28. It is to be realized that a separate switch 66 is provided for controlling the amount of assist provided to each drive wheel 30, with the switches being preferably mounted on the same arm, as indicated in FIG. 1 (but the switches could, if desired, be mounted on each arm adjacent to the drive wheel to be controlled).

Each drive wheel is independently driven and controlled, and the mechanical/electrical arrangements for driving each drive wheel are identical with one such arrangement being illustrated by the block diagram of FIG. 10.

As indicated in FIG. 10, a rim centering unit 69 is provided to assure initial positioning of handrim 34 relative to drive wheel 30. When a user seated in wheelchair 20 applies force on handrim 34 in a direction toward propelling the wheelchair in either direction of rotation of the drive wheel, this causes the handrim to be rotationally displaced from its initial position relative to the associated drive wheel and this displacement is sensed by torque sensor 70 and an electrical signal is generated by the torque sensor. The electrical signal thus generated is coupled, preferably through slip rings 71, to deadband circuit 72 within casing 49, and then to gain control 73 (gain control 73 has user actuatable switch 66 connected therewith), and the resulting user developed force signal is then coupled to signal combiner unit 74, which also receives velocity and acceleration feedback signals.

One output from signal combiner unit 74 is coupled through rectifier 75 and switched amplifier circuit 76 to pulse width modulator 77, the output from which is coupled to motor drive unit 78. Drive unit 78 energizes electric motor 50 to rotate motor shaft 51 to cause rotation of drive wheel 30 through geared transmission 46. The sensed output from signal combiner unit 74 is also coupled to direction sensor unit 80, one output of which is coupled to motor drive unit 78 and another output of which is coupled to switched amplifier 76.

A tachometer 82 senses rotation of drive shaft 51 of motor 50, preferably by optical encoding. The pulses provided are processed by tachometer processor unit 83 to generate a velocity feedback signal which is coupled to signal combining unit 74, with tachometer processor unit 83 also providing an output signal to differentiator 84, which provides an acceleration feedback signal to signal combiner unit 74.

A feedback output from motor drive unit 78 is coupled to current to voltage converter 86, the output from which is coupled through current filter 87 to switched amplifier 76, and through current filter 87 and current limiter 88 back to motor drive unit 78.

Mechanical rim centering unit 69 is illustrated in FIG. 11. As indicated, main hub 33 of drive wheel 30 has a pair of upstanding pins 90 mounted thereon. Center portion 37 of the rim has one end of bar, or beam spring 91 mounted thereon, with the other end of bar spring 91 being forked and having a roller bearing 92 mounted thereon by pin 93.

The bar, or beam, spring urges the roller bearing toward the drive wheel and thus engagement with pins 90 on the drive wheel. Engagement of the roller bearing with both pins 90 maintains the handrim assembly at a centered initial position with respect to the drive wheel whereby the handrim is not displaced with respect to the drive wheel by user force being exerted thereon.

Even though the handrim is permitted to move a maximum of less than two degrees with respect to the drive wheel in either direction, it is the center one-fourth degree that is most critical. It is impractical to build a spring system with zero hysteresis so a mechanical system to automatically center the rim is useful.

Due to the maintained mechanical centering offset by use of pins 90 (a V-shaped detent in the drive wheel could also be used), relatively large forces are needed at first, then very little force is needed once the roller has rolled nearly out of pin engagement. The resistance force on the handrim generated by the pins and roller are, of course, in addition to the force generated by the springiness of the members that connect the handrim assembly to the wheel. Spring force is, of course, directly proportional to displacement. This means that an "S" curve is added to the straight line curve of the spring.

The resulting curve has been tailored so that a force of at least about 4 ounces is needed to cause sufficient displacement of the handrim relative to the drive wheel to effect the onset of power assist (to fully energize the motor to the limits of the gain setting requires 160 ounces). The motor, when energized, will provide power assist only to the extent that has been then set by the gain control. The force curve attempts to produce the maximum controllability at slow speeds while not interfering with the force amplification function once the wheelchair is moving rapidly along an obstacle-free path.

The centering mechanism shown in FIG. 11 may be utilized in conjunction with an electrical system for removing the effects of hysteresis (or either may, of course, be used alone). If used together, any error introduced by one could be offset by the other—for example, an imperfection in the roller bearing might produce a slight offset in mechanical centering.

Overcoming of hysteresis electrically is accomplished through electronic deadband circuit 72, as shown in FIG. 12A. This circuit is utilized at the input to the power unit 40 circuitry within casing 49 to receive the electrical signals generated by handrim mounted torque sensor 70. Deadband circuit 72 includes a pair of op-amps 90 and 96 wired as complementary perfect diodes. Op-amps 95 and 96 receive the output signal from the conditioning circuitry of torque sensor 70, and the outputs from op-amps 95 and 96 are commonly connected to the negative input of op-amp 97 which supplies an output signal to signal combiner unit 74 (through gain control unit 73).

A deadband is introduced around the 5 volt reference point by means of two 3.3M ohms bias resistors which introduce a deadband in which no signal is coupled to the signal combiner unit (and hence to the motor drive unit). The deadband is small, and, as indicated in FIG. 13, is on the order of $+/- 0.15$ volts out of a total input swing of $+/- 3.5$ volts.

Torque sensor 70 produces a directional voltage or current proportional to the force applied to the handrim in the direction to cause rotation of the associated drive wheel (subject to some deviation due to use of hysteresis compensating structure and/or circuitry).

Torque sensor 70 is preferably a capacitance torque sensor that produces a relatively large signal whenever the handrim is deflected a degree or less. The capacitor plates, or halves, for torque sensor 70, shown in FIGS. 14A and 14B, are preferably formed by printed circuit boards 99 and 100 and are mounted in the hub adjacent to one another as illustrated in FIG. 9. The capacitor is formed by narrow, radially extending segments 102 and 103, respectively, printed on boards 99 and 100. The printed circuit boards 99 and 100 are mounted in fixed relationship to the central portion of rim 37 and the drive wheel hub 33, respectively.

As shown in FIGS. 14A and 14B, the radially extending segments 102 and 103 are oriented in an arc extending from the central axis of rotation 105 of drive wheels 30. In operation, the printed circuit boards are closely adjacent and facing each other, as indicated in FIG. 9, so that rotation of the handrim occurs, relative to the drive wheel, about the central axis of rotation 105 and this causes rotation of one printed circuit board relative to the other. This, in turn, causes a change of capacitance due to the change of alignment between the radially extending elements on the two halves of the capacitor.

The central portion of the handrim is preferably connected to the drive wheel hub by a pair of stiff beam springs 106 close to the axle. These springs flex slightly when the handrim is rotated by torque applied to the handrim, and this causes the springs to deflect slightly to effect radial displacement of the alignment between the two circuit boards. As the radially extending segments rotate relative to each other, the capacitance between the two boards changes.

The capacitance is actually divided into two components. Torque in one direction causes an increase in one capacitive component and a decrease in the other capacitive component. The difference in capacitance is electronically conditioned by conditioning circuit 107, as shown in FIG. 12A, to provide a measure of the input handrim force. As shown, the sensing components of capacitor torque sensor 70 (indicated by capacitors 109 and 111 in FIG. 12A) are driven by oscillator 112 (located on one of the capacitor printed circuit boards). Oscillator 112 is a square wave generator that includes three inverters 114, the output of the last of which is coupled to flip-flop buffer 115. The direction of torque is detected by diodes 117 and 118 providing a two-sided input to operational amplifier 120.

The entire sensor unit (including the capacitive sensor elements and the conditioning circuitry) is located within the hub of the drive wheel. The power to drive the unit is brought in through slip rings 71 at 10 volts, and the square wave oscillation is buffered by a flip-flop 93 to insure that the square wave is completely symmetrical. This results in equal signal strength for equal torque in both the clockwise and counter-clockwise directions. The output from the operational amplifier is a relatively large signal, up to +/− 3.5 volts referenced to a 5 volt level, that is easily transmitted from the hub by slip rings without appreciable noise or distortion.

Although not now preferred, a strain gauge arrangement 122, as shown in FIG. 15, may also be utilized as the rim-force torque sensor. In this embodiment, the hand rim is attached to the drive wheel by four rigid spokes, and a set 123 of strain gauges (as indicated in FIG. 15) is placed on each spoke so that two strain gauges 125 and 126 are placed on the opposite side of each of the four spokes to produce a larger change in the resistance of the gauges, and the pairs of strain gauges are connected in a bridge circuit configuration to obtain the largest possible signal output (the signal strength, however, is not as large as may be realized using the capacitor torque sensor).

The strain gauges, when so connected and powered as indicated in FIG. 15, produce a signal whenever the rim is deflected slightly in either direction. Thus, force is detected without allowing, or necessitating, noticeable movement of the handrim relative to the associated drive wheel, with the actual motion being on the order of +/− one degree. The output signal (due to the force sensed by the strain gauges) as well as supplied power, coupled through slip rings 71.

The user force signal generated by torque sensor 70 is coupled through gain control unit 73, as brought out above. This gain control unit is shown in greater detail in FIG. 12A. As shown, a pair of digital-to-analog converters 128 and 129 are utilized (D/A converter 128 is connected with internal gain controls to allow the gain to be adjusted with no access to the user, while control switch 66 is connected with D/A unit 129 to allow user gain adjustment), with the output from D/A convertor 128 being coupled through OP-amp 131 to D/A convertor 129 and the output from D/A converter 129 being coupled to signal combiner unit 74 through op-amp 132. The user can select any one of four settings (equal to about 25%, 50%, 75% and 100%) of available assist power and the resultant user generated force signal is coupled to signal combiner unit 74.

As brought out above, power assist is provided when the user applies force to the handrim in a direction to propel the associated drive wheel in either direction. This force signal, as shown by the block diagram of FIG. 10, is rectified and a pulse width modulated signal produced and applied to the motor drive unit to energize the motor to drive the associated drive wheel.

It has been found that it is difficult to provide effective power assist by simply amplifying the force sensed by torque sensor, particularly when attempting to maneuver at slow speeds. Through the use of a plurality of feedback units, the power assist becomes effective and the feedback was found to the power assist in providing the desired maneuverability. These circuits are shown in the block diagram of FIG. 10, and are shown in greater detail in the schematic diagram of FIGS. 12B, 12C and 12D.

As shown in FIG. 12B, signal combiner unit 74 includes OP-amp 134 which receives the output signal from gain control circuitry 73 (on lead a as shown in FIGS. 12A and 12B) as well as a velocity feedback signal (through a 1.5 m ohm resistor) and an acceleration feedback signal (through a 3 m ohm resistor). Positioned feedback is also realized by the tachometer since it consistently monitors the motor shaft.

The output from OP-amp 134 is coupled through op-amp 36 to direction sensor unit 80 (on lead b as shown in FIGS. 12B and 12C), and to full wave rectifier 75 (formed by diodes 138 and 139) through op-amp 141, with the output from rectifier 75 being coupled through op-amp 143 to switched amplifier circuitry 76 (on lead c as shown in FIGS. 12B and 12C).

Tachometer 82 preferably senses the rotation of motor shaft 52 by conventional optical encoding through optical sensing of indicia (such as stripes on the motor shaft). The tachometer develops dual electrical signals indicative of indicia sensing, and these electrical signals are coupled, as indicated in FIG. 12B, through current sensing field effect transistors (FETS) 145 and 146 of tachometer processor 83 to exclusive OR gates 148 and 149, the outputs of which are coupled to flip-flop (F/F) 151. The signals supplied are square wave pulse trains that have leading or lagging phases depending upon the direction of tachometer sensed rotation.

In addition, the output for exclusive OR gate 149 is coupled to frequency-voltage converter 151 (converter 151 includes exclusive OR gate 153, a CMOS analog switch (designated by the symbol X) and op-amps 155 and 156). The outputs from F/F 151 are coupled to bipolar signal converter 158 (converter 158 includes a pair of CMOS analog switches again designated by the symbol X), which receive a negative output only from frequency-voltage converters 151, and op-amp 160.

The output from converter 158 is coupled from the output of op-amp 160 as an analog signal that is indicative of velocity, and provides the velocity feedback signal to signal combiner unit 74. The analog signal coupled from op-amp 160 is also coupled to differentiator circuity 84, which circuitry includes op-amp 162. The output from op-amp 162 provides the acceleration feedback signal to signal combiner unit 74.

As shown in FIG. 12C, direction sensor 80 (receiving the output from op-amp 136 on lead b) includes a pair of comparators 164 and 165. Comparator 164 provides outputs to direction logic NOR gates 167 and 168 and to back-up logic NOR gate 170 (on lead e as shown in FIGS. 12C and 12D). Comparator 165 provides outputs to direction logic NOR gates 172 and 173 and to back-up logic NOR gate 170 (on lead f as shown in FIGS. 12C and 12D).

As also shown in FIG. 12C, switched amplifier circuitry 76 includes op-amp 175 and a CMOS analog switch (indicated by the symbol x), with the switch being connected with the outputs from direction sensor op-amps 164 and 165 through diodes 177 and 178 (and through lead d as shown in FIGS. 12C and 12D).

The output from switch amplifier 76 is coupled to comparator 180 of pulse width modulator 77. The second input to comparator 180 is provided by the output from comparator 182. The output from comparator 180 is coupled to comparator 184, the output of which is coupled to logic NOR gates 168 and 172 (on lead g as shown in FIGS. 12C and 12D).

A feedback output from motor drive unit 78 (FIG. 12D) is coupled (on lead i as shown in FIGS. 12C and 12D) to current feedback op-amp 186 of current voltage converter 86. The output of current to voltage converter 86 is coupled from op-amp 186 to comparator 188 of current filter circuitry 87. The output of comparator 188 is coupled to switch amplifier circuitry 76 and to op-amp 190 of current limiter 88. The output from op-amp 190 is coupled to logic NOR gates 167 and 173 (on lead h as shown in FIGS. 12C and 12D).

As also shown in FIG. 12C, the +5 volt power is developed by regulator unit 192 to the +10 volt power developed by regulator unit 194 (FIG. 12D). Regulator unit 194 is connected with battery 52 (which battery may be rechargeable as also indicated in FIG. 12D). In addition, battery 52 is connected with FET 196 and provide safety by preventing undesired motor drive.

As shown in FIG. 12D, motor drive unit 78 includes a plurality of current sensing FETS 200 and 201, and FETS 198 and 199 are connected with invert buffers 203 and 204 (formed by FETS 206 and 207) and With FETS 200 and 201 being connected with buffers 209 and 210 (formed by transistors 212 and 213). As shown, each buffer and invert buffer is connected with a different one of logic NOR gates 167, 168, 172 and 173.

The motor control force for the power-assisted wheelchair as described herein is set forth in FIG. 17 and further explains the algorithm utilized. While shown hard-wired, it is to be realized that a microcomputer could also be utilized to provide control as set forth herein.

As can be realized from the foregoing, the motor drive circuitry utilizes the sensor output (as adjusted by the gain control) in conjunction with the plurality of feedback signals to provide drive to each drive wheel of the wheelchair.

The wheelchair motor is primarily intended to produce torque to amplify the torque that the patient is able to generate. The motor is not supposed to achieve some particular velocity that the patient has requested. Motor torque is a function of current, while motor speed (in an unloaded or ideal motor) is a function of voltage. Consequently, it is motor current that is the important controlled quantity, rather than motor voltage. To summarize the control electronics, the handrim torque and motor positional feedback produce a final analog drive signal to the motor that represents the torque that is desired from the motor. The actual motor drive circuitry uses this signal as a reference to produce the requested torque.

The motor drive circuit is basically a constant current generator. If the drive circuit can produce the requested current, then the desired torque will have been delivered. To make the motor circuit efficient, the actual motor drive is accomplished using pulse width modulation, rather than a simple analog motor drive. Current sense FET transistors are used to sense when the pulses are applied to the motor. The pulses are integrated to produce a voltage that represents the average drive current. This feedback goes to the negative input of the constant current amplifier where it cancels out the positive input drive signal when the desired motor current is reached.

Negative acceleration feedback has proved to be effective in preventing instability. The feedback is inserted just ahead of the full-wave rectifier circuit and diminishes the amplitude of a large handrim input request.

Damping the oscillation produced by grabbing the handrim was also a problem solved by providing feedback. Unsigned negative acceleration feedback was ineffective. The reason was that, when the handrim was grasped firmly, the oscillation would attempt to accelerate the wheel equally in both directions. This resulted in a constant acceleration feedback which did nothing to suppress the oscillation.

By developing a signed acceleration signal, the sudden reversal of direction produces an extreme change in acceleration, as it should to cancel the input signal. The behavior of the feedback signals is graphed in FIG. 16. The acceleration trace is plotted on the top line. First, successive pushes on the handrim (seen as downgoing blips) accelerate the wheel to a high velocity. Then the wheel is grabbed firmly. This is seen as a huge positive signal that opposes the changing velocity as shown in the third trace. The second trace shows the unsigned motor current during these events. It can be seen that the highest motor current occurs when the handrim is grabbed. The large surges of current that follow the handrim stopping are actually in such a phase to suppress the oscillation as can be seen from the velocity signal reduction.

A disadvantage of having the large-ratio gear drive is that the gears dissipate energy and make the wheelchair coast poorly. After the user has pushed on the handrims to achieve the speed desired, the wheelchair will coast to a stop quickly because its energy of momentum is quickly dissipated in the gear train. This problem is corrected using positive velocity feedback.

Once a speed is achieved, the speed is maintained for a while by the velocity feedback that is inserted at the input to the summing amplifier. The length of the simulated coast is determined by the gain of the velocity feedback loop. If the feedback were amplified too much, the chair would accelerate rather than just coast. Instead, a feedback gain is selected that produces less drive than needed to maintain (or increase) the present speed. As a result, the motor drive and speed slowly decline simulating a coasting effect. Specifically, the motor speed feedback is set by the 15M ohm resistor at the input to the amplifier input.

The motor direction is determined by a combination of information from the handrim and the signed velocity feedback. These two sources of data are summed to produce a resultant motor direction. A logic system turns on the respective transistors of the motor drive bridge circuit to establish the correct direction. A back-up logic gate insures that only one direction is selected at once.

The logic system generates three basic logic signals: forward, reverse, and "zero switch". "Zero switch" is a logic level that described when there should be no motor current flowing. It is used to suppress the constant motor current drive amplifier to prevent drift. These signals can be seen at the bottom of FIG. 8 which illustrates the basic feedback and motor current levels.

This same velocity maintenance algorithm also serves to allow the wheelchair to be pushed like a conventional chair. Once a desired velocity has been reached, the feedback will allow it to gradually decrease. Without the feedback and the electric motor, the wheelchair behaves as though it were being pushed through deep sand because it will not coast at all.

With the gear train permanently engaged, dynamic braking is realized. The purpose is to provide "power brakes" so that the user does not have to rely on his own strength to stop the chair. If the gear train were disengaged by a ratchet or a clutch to provide a coasting characteristic, then some method would have been needed to reengage the gear train reliably under this condition.

Dynamic braking in the wheelchair is achieved primarily by the active braking initiated by the user. Like any normal wheelchair, this one can be slowed down by putting hand pressure on the hand rims. This braking is dynamic because the braking is actively assisted by the motor. This dynamic braking function is altered by the negative acceleration feedback. Suppose, for example, the user starts down a steep ramp and begins to accelerate rapidly. The rapid increase in velocity is discouraged by the negative acceleration feedback. But more importantly, if the user reacts by grabbing the handrims, the negative feedback will prevent the chair from decelerating so rapidly that it throws the user from the chair.

The velocity feedback, being positive, doesn't prevent the increase in velocity that occurs while coasting down a ramp. Its purpose is to make the wheelchair behave like a normal chair, including a coasting characteristic. As the wheelchair goes faster, friction loss from the gear-train would automatically depress speed, but the coasting algorithm offsets this loss.

As can be appreciated from the foregoing, this invention powers an improved power-assisted wheelchair.

What is claimed is:

1. An electrical power-assist unit for a device having a movement producing unit and an actuator connected with said movement producing unit whereby manual manipulation of said actuator by a user causes movement of said device, said unit comprising:
   power means adapted to cause movement of said device when said power means is powered;
   sensing means for sensing application of force by a user directed toward manual manipulation of said actuator including application of force insufficient to cause of itself a total desired movement of said device, said sensing means providing an electrical output signal indicative of said sensed application of force; and
   signal processing means for receiving said electrical output signal from said sensing means, said signal processing means including first and second electronic feedback means providing velocity and acceleration feedback whereby said signal processing means, responsive to receiving said electrical output signal from said sensing means, develops a controlled signal for causing powering of said power means to substantially achieve said total desired movement of the device.

2. The power-assist unit of claim 1 wherein said sensing means is a displacement sensor configured as one of a capacitive torque sensor and a strain gauge sensor.

3. The power-assist unit of claim 1 wherein said feedback means includes a tachometer and tachometer processor.

4. The power-assist unit of claim 1 wherein said controlled signal causes powering of said power means to provide at least one of efficient device coasting, manual actuation and acceleration limiting.

5. The power assist unit of claim 1 wherein said signal processing means includes a pulse width modulator.

6. The power-assist unit of claim 1 wherein said signal processing means includes means for assuring that no power assist is provided by said power means due to system error with predetermined limits in indicating application of force by a user directed toward manual manipulation of said actuating means.

7. The power-assist unit of claim 6 wherein said means for assuring against application of power includes at least one of electronic and manual means.

8. The power-assist unit of claim 7 wherein said actuator has a centered position and wherein said manual means includes centering means for maintaining said actuator centered when a force is applied by the user.

9. The power-assist unit of claim 7 wherein said actuator has a centered position and wherein said electronic means includes means for precluding signal output to said power means when said actuator is slightly off said centered position.

10. The power-assist unit of claim 1 wherein said power means is continuously connected with said drive means by a geared transmission when said power means is positioned at said device.

11. The power-assist unit of claim 1 wherein said actuator is a handrim movably connected with the drive wheel of a wheelchair, and wherein said sensing means senses the angular displacement of said handrim relative to said drive wheel at the hub of said drive wheel.

12. The power-assist unit of claim 1 wherein said power means is removable from said device.

13. A power-assisted wheelchair comprising:
   frame means;
   a drive wheel rotatably mounted on said frame means;
   a handrim connected with said drive wheel, with said handrim being angularly displaceable with respect to said drive wheel;
   power means including an electric motor mounted on said frame for causing rotation of said drive wheel when said motor is energized;
   sensing means for sensing angular displacement of said handrim relative to said drive wheel, said sensing means providing an output signal indicative of said displacement; and
   signal processing means for receiving said output signal from said sensing means and, responsive thereto, providing a control signal for causing energization of said electric motor, said signal processing means including first and second electronic feedback means providing velocity and acceleration feedback for conditioning said control signal to enhance said provided power-assist.

14. The power-assisted wheelchair of claim 13 wherein said sensing means is one of a torque sensor and a strain gauge sensor.

15. The power-assisted wheelchair of claim 13 wherein said signal processing means includes a tachometer, a tachometer processor, and a differentiator to provide said velocity and acceleration feedback.

16. The power-assisted wheelchair of claim 13 wherein said signal processing means includes rectifier means and pulse width modulation means.

17. The power-assisted wheelchair of claim 13 wherein said signal processing means includes direction sensing means.

18. The power-assisted wheelchair of claim 13 wherein said signal processing means includes current feedback means for enhancing motor operation.

19. The power-assisted wheelchair of claim 13 wherein said signal processing means includes gain control means for enabling a user to adjust the amount of power-assist provided.

20. The power-assisted wheelchair of claim 19 wherein said gain control means includes means for allowing the user to select four multiples of the possible gain offered.

21. The power-assisted wheelchair of claim 13 wherein said power means is connected with said drive wheel through a geared transmission, and wherein said geared transmission includes first and second gears that are meshed only when said power means is positioned at said wheelchair.

22. The power-assisted wheelchair of claim 13 wherein said wheelchair includes means for automatically centering said handrim relative to said drive wheel.

23. The power-assisted wheelchair of claim 13 wherein said signal processing means includes deadband circuit means for precluding a control signal to said power means when said handrim is angularly offset from a predetermined position relative to said drive wheel by a predetermined small amount.

24. A power-assisted wheelchair comprising:
   a plurality of wheels at least one of which is a drive wheel;
   at least one handrim adjacent to and rotatable with respect to said drive wheel, said handrim being rotatable manually by a user to cause rotation of said drive wheel and thereby cause movement of said wheelchair;
   a capacitor torque sensor for sensing angular displacement between said handrim and said drive wheel including application of force insufficient to cause of itself a total desired movement of said wheelchair, said sensor including a first element having first electrically conductive means restricted to movement with said handrim and a second element having second electrically conductive means restricted to movement with said drive wheel, said first and second elements being closely adjacent to one another to form a capacitor the capacitance of which varies due to relative movement between said first and second elements;
   electronic circuit means connected with said first and second elements for developing a controlled signal responsive to the capacitance of said capacitor, said electronic circuit means providing an output indicative of said developed controlled signal; and
   a motor connected with said electronic circuit means to receive said output indicative of said developed controlled signal therefrom and, responsive thereto, causing said motor to propel said wheelchair to substantially achieve said total desired movement of said wheelchair.

25. The power-assisted wheelchair of claim 24 wherein said first and second elements are printed circuit boards having said first and second electrically conductive means printed thereon.

26. The power-assisted wheelchair of claim 24 wherein said electronic circuit means includes signal conditioning means.

27. In a wheelchair having a handrim and a drive wheel connected with the handrim through a plurality of spokes, a sensor for sensing displacement of the handrim of the wheelchair relative to the drive wheel, said sensor comprising:
   a plurality of strain gauges connected in an electrical bridge configuration having a plurality of legs connected with one another at different input and output connecting junctions, and with different ones of said strain gauges being connected in each said leg and to different ones of said spokes;
   electrical power means connected with said input connecting junctions of said strain gauges; and
   output means connected with said output connecting junctions of said strain gauges to provide an output indicative of the displacement between said handrim and said drive wheel as sensed by said strain gauges.

28. The sensor of claim 27 wherein two strain gauges are mounted on each of said spokes with both of said strain gauges being commonly connected in said bridge configuration.

29. A centering device for automatically centering a handrim relative to a drive wheel associated with said handrim, said centering device comprising:
   spring arm means having a first portion adapted to be mounted on one of said drive wheel and handrim;
   roller contact means at a second position of said spring arm means spaced from said first portion; and
   spaced pin receiving means at the other one of said drive wheel and handrim not having said spring arm means mounted thereon, said spaced pin receiving means being adjacent to said roller contact means so that said roller contact means normally engages said spaced pin receiving means to establish a centered position, said roller contact means being urged toward said engagement with said spaced pin receiving means to automatically cause centering therebetween.

30. An electrical power-assist unit for a device having a movement producing unit and an actuator connected with said movement producing unit whereby manual manipulation of said actuator causes movement of the device, said electrical power-assist unit comprising:
   power means adapted to cause movement of the device when said power means is powered;
   sensing means for sensing manual manipulation of said actuator including application of force insufficient to cause of itself a total desired movement of the device, said sensing means including a capacitive element formed by first and second electrically conductive portions relatively movable with respect to one another with said first portion being caused to move relative to said second portion due to movement of said actuator, and with the capacitance established between said first and second portions varying due to said relative movement between said portions; and
   signal processing means electrically connected with said capacitive element of said sensing means and, responsive to the capacitance of said capacitive element, developing a controlled signal for causing powering of said power means to substantially achieve said total desired movement of the device.

31. The power-assist unit of claim 30 wherein said first and second electrically conductive elements are electrically conductive patterns on printed circuit boards.

32. The power-assist unit of claim 30 wherein said signal processing means includes signal conditioning means.

* * * * *